United States Patent [19]

Ka-Chung Yu

[11] 3,864,558

[45] Feb. 4, 1975

[54] ARITHMETIC COMPUTATION OF FUNCTIONS

[75] Inventor: Karl Ka-Chung Yu, Monroeville, Pa.

[73] Assignee: Westinghouse Electric Corporation, Pittsburgh, Pa.

[22] Filed: May 14, 1973

[21] Appl. No.: 360,256

[52] U.S. Cl. .................. 235/193, 235/197, 307/229, 307/288, 307/304

[51] Int. Cl. .............................................. G06g 7/20

[58] Field of Search ............ 235/184, 197; 307/205, 307/229, 230, 237, 239, 251, 255, 257, 264, 288, 304; 328/144, 145

[56] References Cited

UNITED STATES PATENTS

| | | | |
|---|---|---|---|
| 3,457,435 | 7/1969 | Burns et al. | 307/205 |
| 3,471,714 | 10/1969 | Gugliotti et al. | 307/230 |
| 3,500,062 | 3/1970 | Annis | 307/205 |
| 3,541,353 | 11/1970 | Seelbach et al. | 307/205 |
| 3,628,070 | 12/1971 | Heuner et al. | 307/304 |
| 3,636,372 | 1/1972 | Hujita et al. | 307/288 |
| 3,657,575 | 4/1972 | Taniguchi et al. | 307/304 |
| 3,659,118 | 4/1972 | Meyer | 307/304 |
| 3,668,428 | 6/1972 | Koerner | 307/229 |

OTHER PUBLICATIONS

Frohman-Beutschkowsky: Memory Behaviour in a Floating-Gate Avalanche-Injection MOS Structure, Applied Physics Letters, Vol. 18, No. 8, April 1971, p. 332–334.

Hildebrand: Digital Integrated Circuits with Field-Effect-Transistors, Nachrichtemtechnische Zeitung No. 10–1970 p. 495–500.

*Primary Examiner*—Felix D. Gruber
*Attorney, Agent, or Firm*—J. B. Hinson

[57] ABSTRACT

An analog for the square of the difference of a first magnitude and a second magnitude, regardless of the polarity of this difference, is produced by a p-channel insulated-gate field-effect transistor (IGFET) and an n-channel IGFET with their sources and drains connected in anti-parallel. In particular, the IGFETS are MINSTORS each having a memory gate. The gates of the IGFETS are connected together. Where the IGFETS do not have memory gates, one magnitude is simulated or measured by the threshold voltage of one of the IGFETS, which is determined by fabrication, and a gate voltage measuring the second magnitude is impressed on the gates of the IGFETS. A drain voltage which produces saturation current is impressed between both sources and drains. The resulting saturation current measures the square of the difference between the gate voltage and threshold voltage regardless of the polarity of this difference. Where the IGFETS have memory gates (are MINSTORS), and are matched, the gates are polarized so that the threshold voltage of one of the MINSTORS measures one magnitude and a gate voltage measuring the second magnitude is impressed on the MINSTORS. The saturation drain current of the MINSTORS then measures the square of the difference between the magnitudes. If the MINSTORS are unmatched, threshold voltages differing by a constant may be impressed separately on the gates by polarizing-voltages which differ appropriately and/or by applying the polarizing voltages for different time intervals. Alternatively, for unmatched MINSTORS, the source-drain voltage may be maintained substantially equal to the difference between the threshold voltages. MINSTORS have greater flexibility than IGFETS without memory gates because they can be set by polarization to measure or simulate different magnitudes.

15 Claims, 20 Drawing Figures

ARITHMETIC COMPUTATION OF FUNCTIONS

REFERENCE TO RELATED DOCUMENTS

The following documents are incorporated in this application by reference:

1. U.S. Pat. No. 3,652,324 — Chu et al. — relating to MINSTORS;
2. Application Ser. No. 293,241 filed Sept. 28, 1972 to Herbert J. Reitboeck et al;
3. Application Ser. No. 360,272 filed May 14, 1973 to Herbert J. Reitboeck et al.;
4. J. R. Szedon and R. M. Handy — Characterization Control, and Use of Dielectric Charge Effects in Silicon Technology — Journal of Vacuum Society, Tech 6, 1 (1969);
5. K. K. Yu, G. A. Gruber and J. R. Szedon — Evidence of Hole Injection in MNOS Memory Devices — Device Research Conference — Seattle, Washington 1970;
6. J. R. Szedon — An Insulated Gate Field Effect Transistor Non-Volatile Memory Element Using Tunnel Trapping in a Double Layer Dielectric — Westinghouse Scientific Report 68-1F1-SOISS-R1 (1968).

BACKGROUND OF THE INVENTION

This invention relates to the art of producing, for purposes of computation, the electrical analog of a function and has particular relationship to the producing of the analog of the square of the difference of two magnitudes. In statistical analysis and in related practices it is necessary to derive the square of a deviation or difference between a first magnitude N1 and a second magnitude N2. The analog of such a square can be produced by a solid-state component called generally an insulated-gate field-effect transistor (IGFET). The saturation current of such an IGFET is given by $$I_{DSAT} = K(V_{GS} - V_T)^2 \quad (1)$$

wherein $I_{DSAT}$ = Saturation current flowing between the source and the drain.

$K$ = A constant dependent on the width-to-length ratio of the IGFET, its material properties and related factors.

$V_{GS}$ = The voltage of the gate relative to the source.

$V_T$ = Threshold voltage, sometimes referred to as flat-band voltage and designated $V_{FB}$.

It appears desirable to explain the significance of the above parameters. The basic IGFET has a source, a drain and an insulated gate. The source is the electrode usually connected to the substrate. For a p-channel IGFET the source and drain are doped with holes and the substrate with electrons; for an n-channel IGFET the source and drain are doped with electrons and the substrate with holes.

In general, the threshold voltage, $V_T$, of an IGFET is fixed by fabrication. However, among the components generally referred to as IGFET, there are MINSTORS. In MINSTORS $V_T$ can be electrically altered after fabrication. Thus, the gate of a MINSTOR may also be referred to as a memory gate because once $V_T$ is set for a MINSTOR, it remains set until erased. MINSTORS may have a control gate or several control gates in addition to the memory gate. As used in this application the word "MINSTOR" means any IGFET with a memory gate including, but not limited to, the MINSTOR disclosed in Chu U.S. Pat. No. 3,652,324. The threshold voltage, $V_T$, of a MINSTOR, referred to as memory voltage to distinguish it from the ordinary $V_T$ of IGFETS, can be altered in the following manner: When a potential, typically of about 40 or 50 volts, of either polarity is impressed between the memory gate of a MINSTOR and the source and drain connected together (that is, between the gate and substrate) for a predetermined time interval, a charge is bound in the insulator between the gate and the substrate and a memory voltage appears between the memory gate and the source with the source as reference. The magnitude of this memory voltage depends on the magnitude of voltage impressed and on the duration of the interval during which it is impressed. The memory voltage is also the threshold voltage, $V_T$, or the flat-band voltage $V_{FB}$ of an ordinary IGFET. The voltage (about 40 or 50 volts) which impresses the memory voltage is usually called the polarizing voltage or the memory-voltage-impressing voltage. The memory voltage may be erased from the gate by impressing a voltage of opposite polarity to the polarizing voltage for a predetermined time interval. This antipolarizing voltage is called an erasing voltage. Once polarized with a memory voltage $V_T$, conduction may be produced by a gate voltage $V_{GS}$ of appropriate magnitude impressed between the gate and the source. The memory voltage $V_T$ and the gate voltage $V_{GS}$ are both substantially smaller than the polarizing or erasing voltage and do not affect the polarization of the gate. The MINSTOR then operates just like an IGFET.

With an appropriate voltage $V_A$ between the source and the drain, saturation current $I_{DSAT}$, as defined by Equation 1, flows between the source and the drain. But in a p-channel IGFET, current only flows if $V_T$ exceeds $V_{GS}$ and for an n-channel if $V_{GS}$ exceeds $V_T$ assuming the source to be a reference. The function defined in Equation 1 may be called the current-gate-voltage characteristic.

In a typical application of the IGFET, a plurality of components connected in parallel can be considered. It may be assumed that on each device there are impressed a threshold voltage measuring or simulating a first magnitude of a set, and a gate voltage measuring or simulating a second corresponding magnitude of related set. If the components are connected in parallel to a common saturating voltage supply, the total current through the devices measures or simulates the sum of the squares of the deviations of the first and second magnitudes. The threshold voltage $V_T$, like $V_{GS}$, is referred to the source of an IGFET; that is, it is a voltage between the gate and the source and thus depends on the pole of the source-drain voltage to which the source is connected.

Experience in the use of a single IGFET to measure the square of each deviation has revealed that the device has limited utility over a limited range. For a p-channel IGFET the range is only for values of $V_{GS}$ where $$V_{GS} - V_T \leqq 0 \quad (2)$$

and for an n-channel MINSTOR the range is only for $V_{GS}$ where $$V_{GS} - V_T \geqq 0. \qquad (3)$$

In practice, where determination of the sum of the squares of deviations is necessary, and particularly in statistical analysis, it is essential that the square of the deviation in either sense, positive or negative, be computed. And this computation cannot be effected with single type IGFETS as taught by the prior art.

It is an object of this invention to overcome the above-described disadvantage of the prior art and to provide apparatus and a method for producing in a simple operation an analog of the square of the deviation between a first magnitude and a second magnitude regardless of the sense of the deviation.

SUMMARY OF THE INVENTION

In accordance with this invention the square of the deviation of a first magnitude from a second magnitude is determined by an analog computer unit including a p-channel IGFET and an n-channel IGFET; in particular, the IGFETS are MINSTORS. The source and drain of one IGFET is connected in a network in anti-parallel with, or inversely to, the source and drain of the other IGFET. In accordance with one aspect of this invention, the IGFETS are of the type that have no memory gates and are matched; *K* of Equation 1 is the same for both IGFETS. IGFETS, without memory gates, may be matched when their gate-to-substrate insulators are of the same thickness and their sourcedrain electrodes have equal spacing. For a common drain voltage $V_A$ of appropriate magnitude, the current-gate-voltage characteristics of the IGFETS of the pair merge into a parabola with an apex at only one point. In this case the gates of the IGFETS are connected together and the threshold voltage $V_T$ of a selected IGFET measures; that is, is proportional to the first magnitude N1. The common voltage $V_A$, which is capable of producing saturation current, is impressed between the sources and drains and a gate voltage $V_G$, measuring; that is, proportional to the second magnitude N2, is impressed between the gates and a reference electrical point (ground). The saturation current which flows is then proportional to the square of the difference between $V_G$ and $V_T$, regardless of its polarity; this is a measure of the square of the difference between the first and second magnitudes attained. It is emphasized that $V_G$ is compared to a different voltage in each of the pair of IGFETS since the $V_T$ for each, being referred to its source, is different.

While this invention concerns itself with, and extends in scope generally to, IGFETS, it has unique utility when the pairs are MINSTORS which have memory gates. Where ordinary IGFETS are used, only one magnitude can be simulated by the selected threshold voltage. The only facility available is then the derivation of the squares of the deviations of a plurality of magnitudes from one magnitude. In the case of MINSTOR pairs, the memory gates afford the facility of impressing memory voltages simulating different first magnitudes, or two magnitudes, so that the squares of the deviations between different first and second magnitudes may be derived with a single MINSTOR pair. As used in this application the expression "matched MINSTORS" of a pair means not only MINSTORS of the pair whose *K* of Equation 1 is the same but also MINSTORS of the pair whose threshold voltages at any polarization differ by a constant. Where the difference between the threshold voltages for different polarizations are not constant the MINSTORS are referred to as unmatched. Matched MINSTORS subjected to the same polarizing potential for equal time intervals have the same change of threshold potential impressed on them. To match a p-channel with an n-channel MINSTOR, the insulator between the gate and substrate of the n-channel MINSTOR may have lower thickness than the corresponding insulator for the p-channel substrate and/or the substrate of the n-channel MINSTOR may be provided with a surface treatment reducing the effective work function for electrons.

Where the IGFETS are MINSTORS having a memory gate and are matched, the sources and drains and substrates of both MINSTORS of the pair are connected together and the gates are connected together and a polarizing voltage is impressed between the sources, drains and substrates and the gates for a predetermined interval of time. In effect, this polarizing voltage may be regarded as impressed between the gates and the substrates. Depending on the time interval, a threshold voltage is impressed between each gate and each substrate. This voltage measures one of the magnitudes. The sources and drains of the MINSTORS are then disconnected from each other and connected in anti-parallel to a saturating voltage $V_A$ of appropriate magnitude and the gate voltage $V_G$ measuring the second magnitude is impressed on the gates. The saturation drain current which flows through the MINSTORS simulates or measures square of the deviation, regardless of its polarity, of the second magnitude from the first magnitude.

When the MINSTORS are unmatched they are polarized separately, at different polarization voltages between the memory gates and substrates and/or for different time intervals, to the same absolute threshold voltage difference to be determined by $V_A$ (both $V_T$ are measured between the gates and substrates). One of the threshold voltages measures one magnitude. The current-gate-voltage characteristic is then a full parabola and the procedure described above for matched MINSTORS can be followed. In accordance with another aspect of this invention, $V_A$ is maintained substantially equal to the difference between the threshold voltages for unmatched MINSTORS. The current-gate-voltage characteristic is then also a full parabola.

BRIEF DESCRIPTION OF THE DRAWING

For a better understanding of this invention, both as to its organization and as to its method of operation, together with additional objects and advantages thereof, reference is made to the following description taken in connection with the accompanying drawings, in which.

DETAILED DESCRIPTION OF INVENTION

Figures 1, 2:
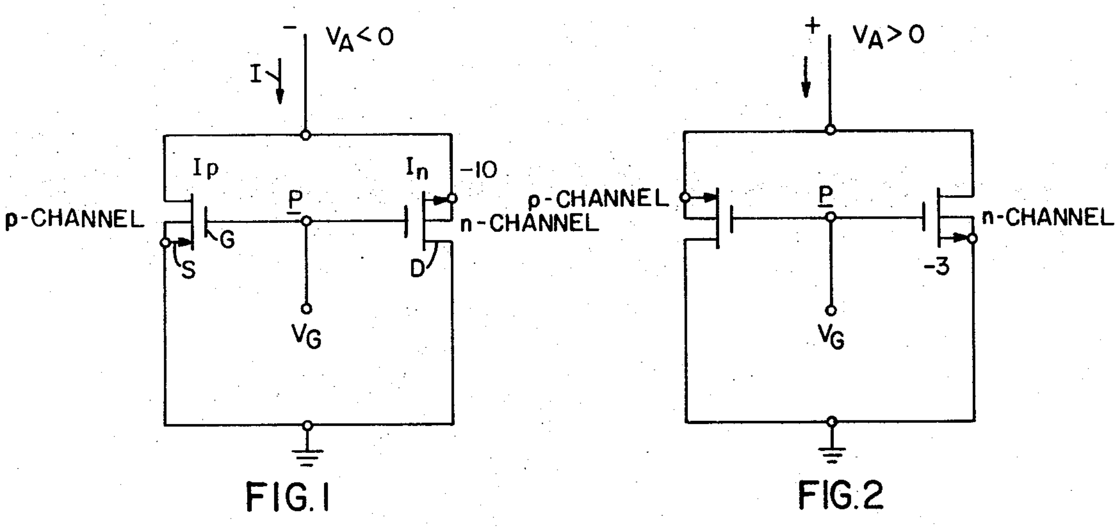
FIG. 1 is a schematic showing the basic circuit according to, and for practicing, this invention with IGFETS of any type.
FIG. 2 is a schematic showing a modification of the circuit shown in FIG. 1.

The apparatus shown in FIGS. 1 and 2 are a pair P of IGFETS, one, $I_p$, a p-channel IGFET, and the other, $I_n$, an n-channel IGFET. The IGFETS may be components with non-memory gates or MINSTORS. The sources S and drains D of the IGFETS $I_p$ and $I_n$ are connected in antiparallel and the gates G are connected together. A potential $V_A$ is impressed between the sources S and drains D. In the circuit shown in FIG. 1 the potential $V_A$ is negative and for FIG. 2 it is positive. A gate potential $V_G$ is impressed between the gates and a reference electrical point usually ground. The p-channel IGFET has a threshold potential $V_{TP}$ and the n-channel IGFET, $V_{TN}$; $V_{TP}$ and $V_{TN}$ are not equal. The voltages $V_{TP}$ and $V_{TN}$ are referred to the source in each case and the level of each above or below ground depends on the circuit connection of the corresponding source. In FIG. 1, $V_{TP}$ is $V_{TP}$ with reference to ground while $V_{TN}$ is with reference to the negative pole of $V_A$. $V_{TP}$ and $V_{TN}$ are fabricated into the IGFETS $I_p$ and $I_n$ and have magnitudes independent of $V_A$.

Figure 3:
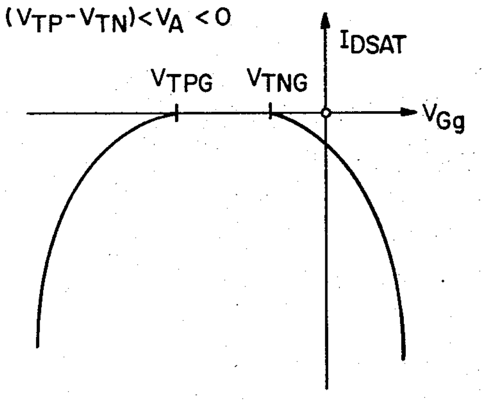
FIGS. 3, 4, 5, 6, 7, 8, 9, 10 are graphs illustrating various aspects of the apparatus shown in FIGS. 1 and 2.
Figure 4:
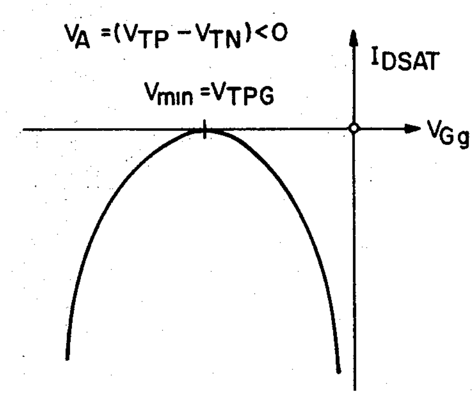
Figure 5:
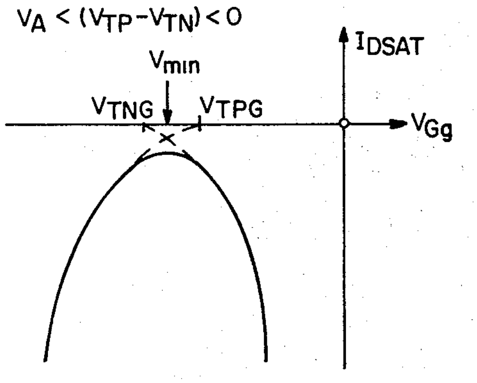
Figure 6:
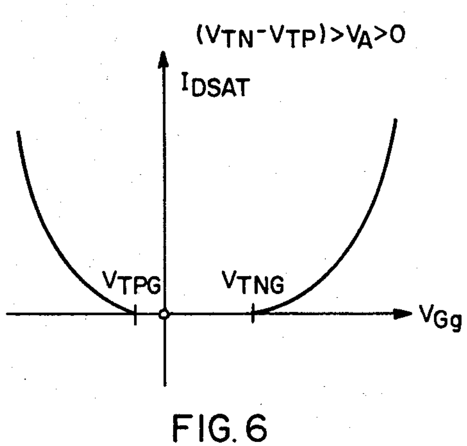
Figure 7:
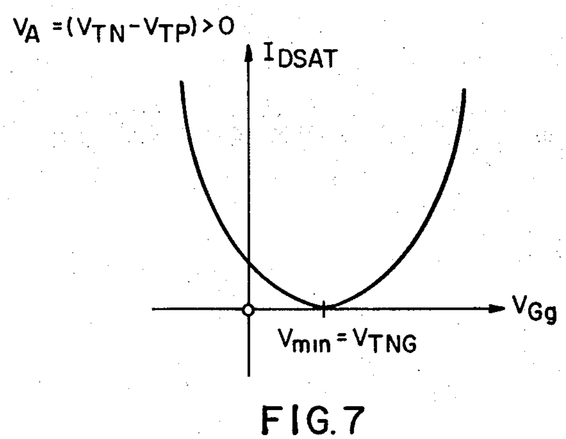
Figure 8:
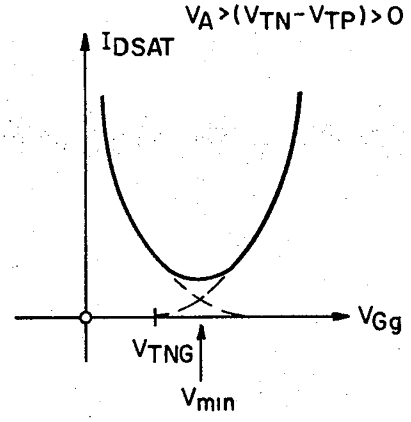
Figure 9:
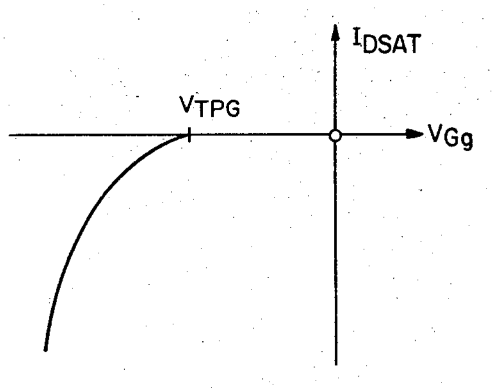
Figure 10:
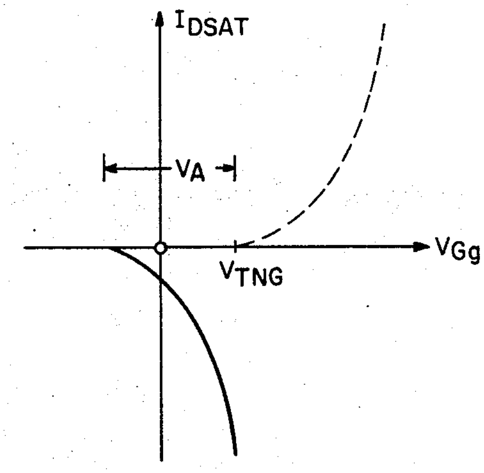

FIGS. 3 through 10 are graphs showing the current-gate-voltage characteristics for different relationships between $V_{TP}$, $V_{TN}$, and $V_A$. In each group $I_{DSAT}$ is plotted as ordinate and $V_{Gg}$, the voltage of the gate relative to ground, as abscissa. Zero voltage for $V_{Gg}$ and $V_A$ is ground. Since $V_{TP}$ and $V_{TN}$ are referred to the source, the threshold voltages plotted in FIGS. 3 through 10, which are with reference to ground, are labelled TPG and TNG to avoid confusion. The characteristics shown in FIGS. 3 through 10 can be visualized as follows: Consider the circuit of FIG. 1 where $V_A$ is negative. The connections of the substrates of the p-channel and n-channel IGFETS $I_p$ and $I_n$ are such that the source terminal of the p-channel is the ground terminal while the source terminal of the n-channel is the $V_A$ terminal. Neglecting the n-channel IGFET $I_n$ for the moment, the $I_{DSAT} - V_{Gg}$ curve is the transfer characteristic of the p-channel IGFET alone and is described by Equation (1) for $(V_{GS} - V_{TP}) \leq 0$. In this case $V_{GS} = V_{Gg}$. The on-set of current occurs at $V_{Gg} = V_{TPG}$ as shown in FIG. 9. Now, neglect the p-channel IGFET and consider the n-channel IGFET alone as connected in FIG. 1. Because $V_{Gg}$ is measured on the graphs with respect to ground (the drain D of the n-channel device), and because of the current direction chosen for the circuit, the n-channel transfer characteristic is displaced as shown in FIG. 10. Combination of the characteristics of FIGS. 9 and 10 together then gives the desired final $I_{DSAT} - V_{Gg}$ characteristics of FIGS. 3, 4, 5. Similarly, the characteristics for the circuit of FIG. 2 can be deduced. The only difference is that the n-channel IGFET, $I_n$, is now operated in the conventional way and the p-channel IGFET ($I_p$) characteristics are displaced accordingly. When $V_{TP} - V_{TN}$ is negative and less than $V_A$, which is also negative, the characteristics are spaced at the abscissa (FIG. 3). This is an unsatisfactory condition. The same condition results when $T_{TN} - V_{TP}$ is positive and greater than $V_A$ which is also positive (FIG. 6).

When $V_A = (V_{TP} - V_{TN})$ and is negative or $V_A = (V_{TN} - V_{TP})$ and is positive, the branches of the current-gate-voltage characteristics merge with the merged apex on the abscissa and the combined characteristic has satisfactory parabolic form (FIGS. 4 and 7).

When $V_A = (V_{TP} - V_{TN})$ and is negative, the apex of the parabola occurs at a gate voltage of $V_{min} = V_{TP}$ (FIG. 4). Similarly, when $V_A = (V_{TN} - V_{TP})$ and is positive, the apex of the parabola occurs at a gate voltage of $V_{min} = V_{TN}$ (FIG. 7).

The two branches of the current curve overlapped as shown in FIGS. 5 and 8 by impressing a voltage $V_A$ such that $|V_A| > |V_{TP} - V_{TN}|$. The equation of the resulting parabola formed by the addition of the two branches is:

$$I_{DSAT} - I_{min} = 2K(V_{Gg} - V_{min})^2$$

where $I_{min}$ is the current at the apex of the parabola and $V_{min.}$ can be determined by deriving the coordinates of the points of intersection of the two parabolas in FIG. 5 which correspond to FIG. 1, where $V_A$ is negative, and in FIG. 8, where $V_A$ is positive. In FIGS. 5 and 8, the threshold voltages are referred to ground. It is stated above, that $V_{TP}$ and $V_{TN}$ are referred to the source in each case. Since in FIG. 1 the source of $I_n$ is at $V_A$ and in FIG. 2 the source of $I_p$ is at $V_A$, it is necessary to distinguish between the threshold voltages as they are presented in FIGS. 5 and 8 and the voltages designated $V_{TP}$ and $V_{TN}$. The threshold voltages in FIG. 5 and FIG. 8 are designated $V_{TNG}$ and $V_{TPG}$. With reference to FIG. 1, for FIG. 5

$$V_{TPG} = V_{TP} \quad (1)$$

and $$V_{TNG} - V_A = V_{TN} \quad (2)$$

and for FIG. 8

$$V_{TPG} - V_A = V_{TP} \quad (3)$$

$$V_{TNG} = V_{TN} \quad (4)$$

The equations for the two parabolas in FIG. 5, $$I = -K(V_{Gg} - V_{TPG})^2 \quad (5)$$

$$I = -K(V_{Gg} - V_{TNG})^2 \quad (6)$$

At the point of intersection of the two parabolas $I = I_{min}$ for both parabolas and $V = V_{min}$ for both parabolas, $V_{min}$, $I_{min}$ being the coordinates of this point of intersection. Therefore, $$-K(V_{min} - V_{TPG})^2 = -K(V_{min} - V_{TNG})^2 \quad (7)$$

$$V_{min}^2 - 2V_{min} V_{TPG} + V^2_{TPG} = V^2_{min} - 2V_{min}V_{TNG} + V^2_{TNG} \quad (8)$$

Simplifying and transposing (8)

$$2V_{min}(V_{TNG} - V_{TPG} = V^2_{TNG} - V^2_{TPG} \quad (9)$$

$$V_{min} = V_{TNG} + V_{TPG}/2$$

Substituting for $V_{TNG}$ and $V_{TPG}$ per equations (1) and (2)

$$V_{min} = V_{TN} + V_A + V_{TP}/2 \quad (10)$$

Substituting for $V_{Gg}$ which is $V_{min}$ in (5)

$$I_{min} = -K(V_{TN} + V_A + V_{TP} - T_{TP})2/2 \quad (11)$$

$$= -K/2\ (V_{TN} + V_A - V_{TP})^2 \quad (12)$$

Similarly, for FIG. 8

$$I_{min} = K/2\ (V_{TP} + V_A - V_{TN}) \quad (13)$$

Satisfactory operation of the apparatus shown in FIGS. 1 or 2 can then be achieved with matched IGFETS as follows:

Where $V_{TP} - V_{TN}$ is negative:
- $V_{TP}$ is set to measure one magnitude,
- $V_A$ is set substantially equal to $V_{TP} - V_{TN}$,
- $V_G$ is set to measure the other magnitude,
- $I_{DSAT}$ measures the square of the difference between the magnitudes.

Where $V_{TN} - V_{TP}$ is positive:
- $V_{TN}$ is set to measure one magnitude,
- $V_A$ is set substantially equal to $V_{TN} - V_{TP}$,
- $V_G$ is set to measure the other magnitude,
- $I_{DSAT}$ measures the square of the difference between the magnitudes.

The conditions represented by FIGS. 5 and 8 are also usable.

Figure 11:
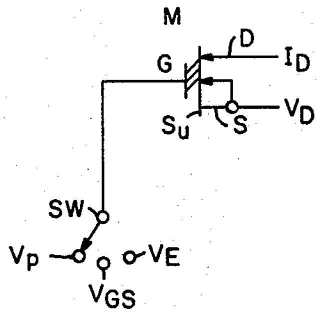
FIG. 11 is a fragmental schematic presented to aid in the understanding of the aspect of this invention involving MINSTORS.

The apparatus shown in FIG. 11 includes a MINSTOR M having a source S, a drain D and a gate G. To polarize the MINSTOR, the source S and drain D are connected together and a polarization voltage $V_P$ is impressed between the gate G and the source and drain; that is between G and the substrate SU. Essentially, the polarizing voltage is impressed between the gate G and the substrate SU. Another way of polarizing the MINSTOR is to impress the polarizing voltage between the gate G and the source S with the drain open-circuited or floating or between the gate G and a polarizing electrode (not shown) connected to the substrate SU and the drain and source floating.

Figure 12:
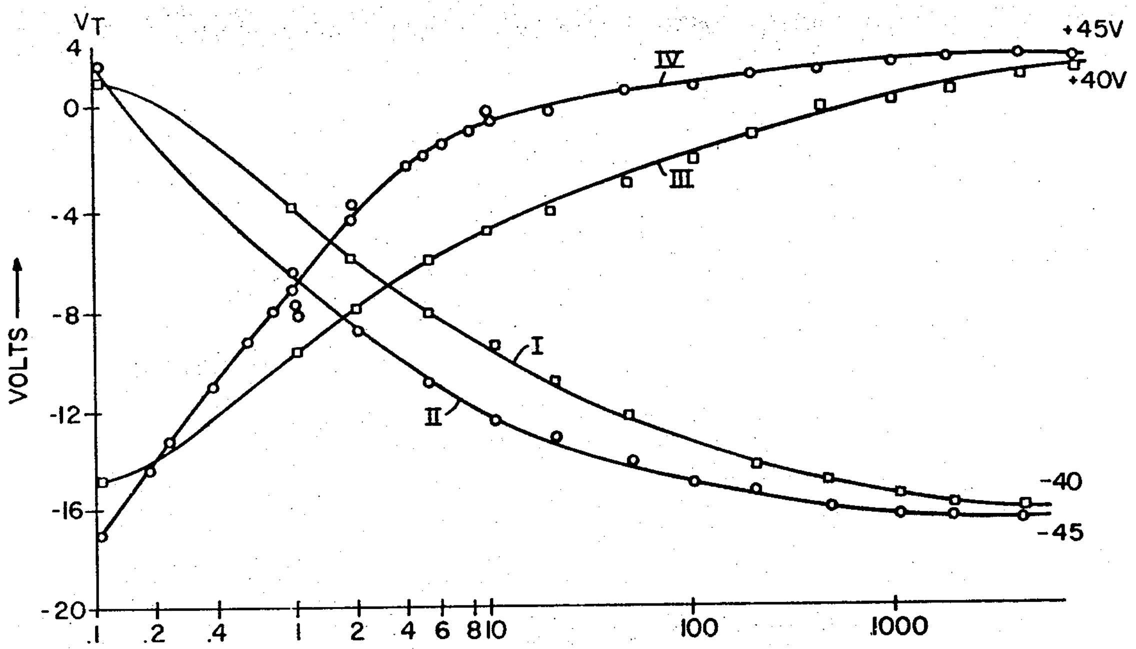
FIG. 12 is a graph illustrating polarization of a MINSTOR to selected threshold voltages and the erasing of threshold voltages.

FIG. 12 illustrates the process of polarization. Threshold voltage, $V_T$, is plotted vertically in volts and time horizontally (logarithmically) in microseconds. Two polarization curves, I and II, are shown for the gate G at −40 and −45 volts, respectively, relative to the substrate SU, and two, III and IV, for the gate at +40 and +45 volts relative to the substrate SU. Either polarity of polarization voltage (curves I or II or III or IV, respectively) can be used to polarize. The threshold voltage varies between about −17 volts and +1.5 volts.

Once a threshold voltage measuring one magnitude is impressed, the source S and drain D are disconnected, a saturation drain voltage $V_A$ is impressed and a voltage $V_{GS}$ measuring the second magnitude is impressed between the gate and the source. $V_{GS}$ is in about the same range as $V_T$ and does not affect the polarization. The saturation drain current $I_{DSAT}$ measures the square of the difference between the magnitudes. The threshold voltage may be erased; that is, changed from its previous setting, by setting switch SW in position $V_E$ and connecting the source S and drain D together. In this position an erase voltage of opposite polarity to the polarization voltage is impressed. If positive +40 volts or +45 volts were impressed to polarize, −40 volts or −45 volts respectively are impressed to erase. The erase voltage may be impressed for a second or two to assure complete erasure.

The following Table I shows the actual data derived with three pairs of MINSTORS identified as "4," "5," "6:"

TABLE I

Threshold Voltages of MINSTORS

| | p-channel | | n-channel | | |
|---|---|---|---|---|---|
| Pair No. | Minstor No. | $V_{TP}$ | Minstor No. | $V_{TN}$ | $V_{TP} - V_{TN}$ |
| 4 | 5-4 | −3.9 | 5-4 | +2.1 | −6.0 |
| 5 | 5-2 | −5.3 | 5-3 | −0.3 | −5.0 |
| 6 | 5-8 | −0.6 | 5-8 | +4.7 | −5.3 |

The pairs were compared with the same drain voltage $V_A$. The threshold voltages were measured assuming 10 microamperes to be the lowest current magnitude above 0.

Figure 13:
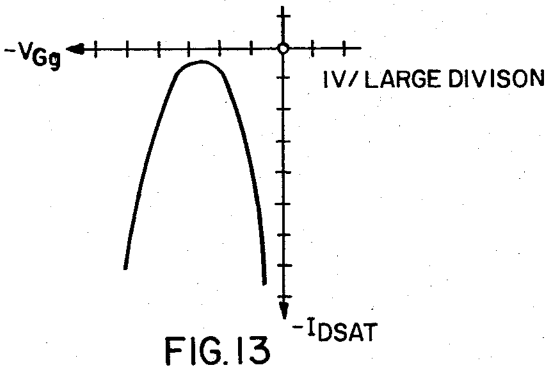
FIGS. 13, 14, 15, 16, 17 show current-gate-voltage characteristics determining for actual pairs of IGFETS.
Figure 14:
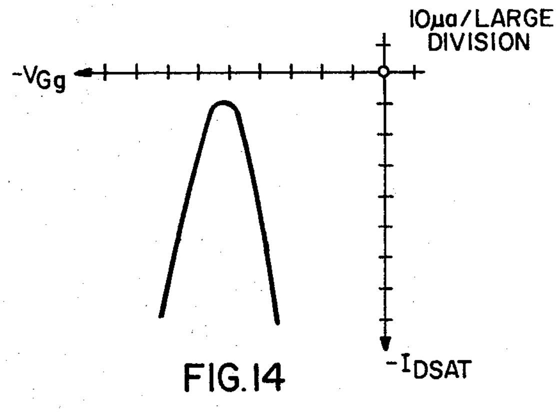
Figure 15:
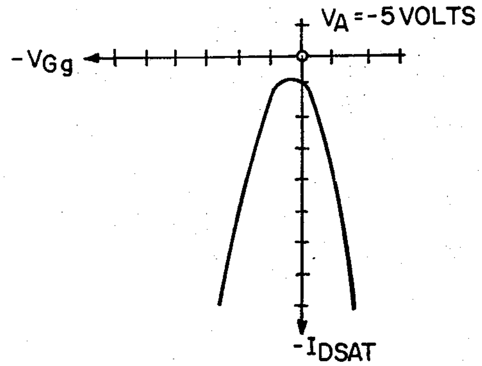

FIGS. 13, 14, 15 show the $I_{DSAT} - V_G$ characteristics for pairs 4, 5, 6 respectively at $V_A = -5$ volts for all pairs. The circuit for which these graphs were plotted is that shown in FIG. 1. Current which is negative is measured downwardly along the ordinate; $V_G$ which is also negative and is measured to the left along the abscissa. A division along the abscissa measures 1 volt and a division along the ordinate measures 10 microamperes.

The curves shown in FIGS. 13, 14, 15 are parabolas with sharp apices which occur at $V_{min}$. The point ($V_{TP}$, 10$\mu a$) of each graph is to the left of the minimum point of the corresponding curve.

Figure 16:
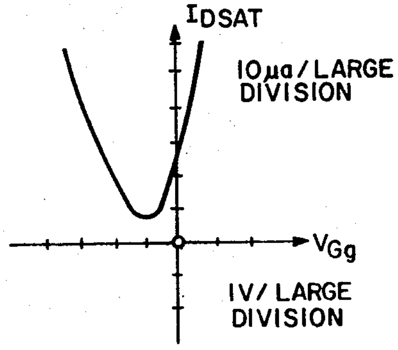
Figure 17:
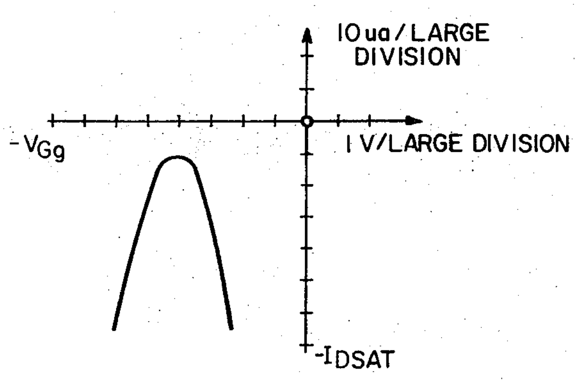

FIGS. 16 and 17 are graphs similar to FIGS. 13, 14, 15 for another pair of MINSTORS. FIG. 16 shows the $I_{DSAT} - V_G$ characteristic with the circuit shown in FIG. 2 and FIG. 17 with the circuit shown in FIG. 1.

Figures 18, 19:
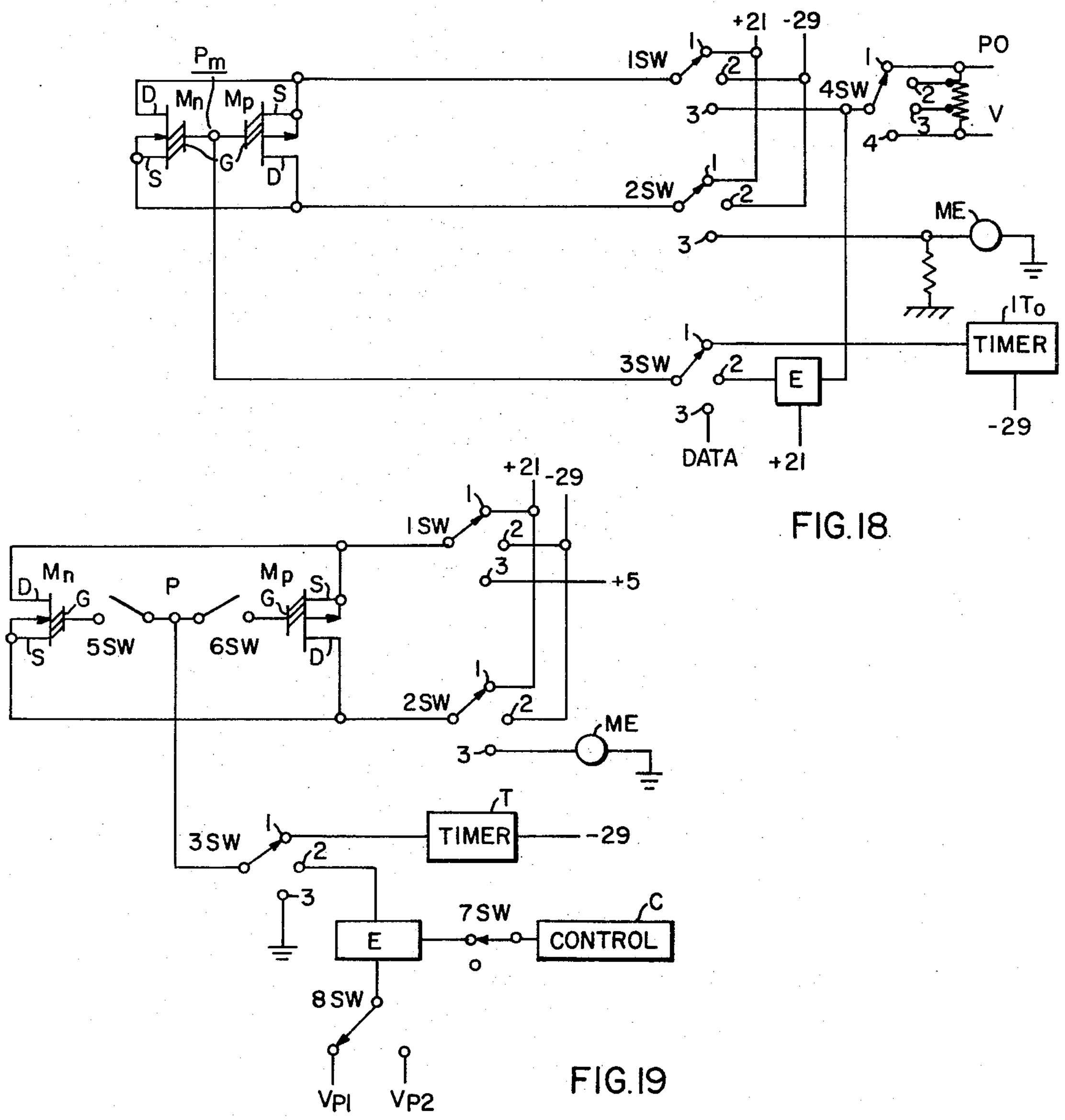
FIG. 18 is a schematic showing apparatus according to, and for practicing, this invention with facilities for polarizing and erasing the threshold voltage and carrying out a computation.
FIG. 19 is a schematic showing a modification of the apparatus shown in FIG. 18.

FIG. 18 shows apparatus in accordance with one aspect of this invention in which a MINSTOR-pair $P_m$ serves to compute the square of the deviation of two magnitudes. The voltages shown on FIG. 18 are typical.

For controlling the MINSTOR pair $P_m$ the apparatus includes switches 1SW, 2SW and 3SW, which symbolize electronic switches, and have positions 1, 2, 3. In these positions the switches are set simultaneously. The gates G are connected together. The drain voltage $V_A$ is derived from a potentiometer PO which is shown as having discreet points but may also be continuous. The $V_A$ setting is controlled by switch 4SW which also symbolizes electronic switching.

Switches 1SW, 2SW, 3SW are initially set in position 1, the erase position. Switch 3SW impresses −29 volts on the gates G through the timer T and switches 1SW and 2SW impress +21 volts on the sources S and drains D connected together. The timer T times for an interval long enough to erase any early threshold voltages from the gates G.

Switches 1SW, 2SW, 3SW are then set in position 2, the encode position. In this position +21 volts is impressed by 3SW on the gates G through an encoder E which is a timer that converts one of the magnitudes to be compared into a time interval. Switches 1SW and 2SW connect the sources and drains respectively to −29 volts. As shown in FIG. 12 the timing of encoder E impresses a predetermined threshold voltage $V_{TP}$ or $V_{TN}$ measuring the one magnitude on the gates G.

Figure 20:
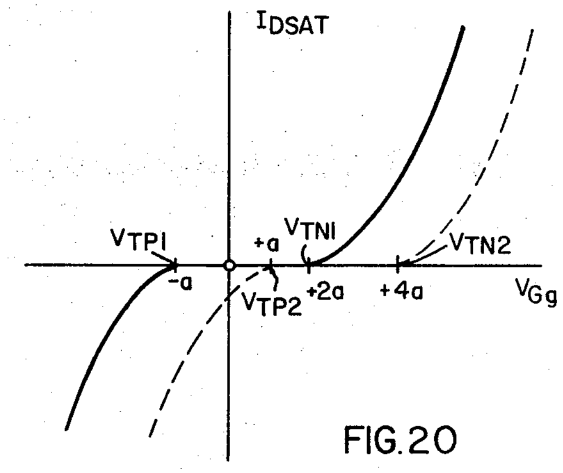
FIG. 20 is a graph showing the relationship between the threshold voltages $V_{TP}$ and $V_{TN}$ on matched individual MINSTORS when these voltages are changed.

Switches 1SW, 2SW, 3SW are then set in position 3. In this position a gate voltage $V_G$, measuring the second magnitude, is impressed through switch 3SW. If the MINSTORS $M_p$ and $M_n$ are matched, $V_{TN} - V_{TP}$ remains unchanged as shown in FIG. 20 for two settings $V_{TN1}$ and $V_{TN2}$, of $V_{TN}$ and two settings $V_{TP1}$ and $V_{TP2}$, of $V_{TP}$. Switch 4SW then impresses a suitable voltage, say +5 volts, equal to $V_{TP} - V_{TN}$, on the source S of $M_p$ and the drain of $M_n$, and the drain of $M_p$ and the source of $M_n$ are connected to ground through a meter ME which measures the current flowing through the pair P.

If the MINSTORS $M_p$ and $M_n$ are not matched, the switch 4SW is set by a signal from encoder E to a position such that $V_A = V_{TP} - V_{TN}$ or $V_{TN} - V_{TP}$. To provide the proper setting the MINSTORS $M_p$ and $M_n$ are precalibrated. In either setting of the switches 1SW through 4SW the reading of meter ME provides a measure of the square of the difference between the magnitudes. Indeed the meter may be calibrated so that its scale shows the square of the deviation of the magnitudes. Where a plurality of unmatched pairs are to be operated to provide the squares of the deviations of a plurality of pairs of magnitudes, the output of a plurality of meters ME may be supplied to a summer.

The apparatus shown in FIG. 19 differs from the apparatus in that it includes facilities for polarizing the MINSTORS $M_p$ and $M_n$ for different intervals and/or at different polarizing voltages so that for any magnitude the same threshold voltage difference is impressed on both gates G. This apparatus includes the switches 5SW, 6SW, 7SW and 8SW which symbolize electronic switching.

With switches 1SW, 2SW, 3SW in position 1, switches 5SW and 6SW are closed and the threshold voltages are erased from the gates. Then switches 5SW and 6SW are opened and 1SW, 2SW, 3SW are set in position 2. Switch 5SW is then closed, switch 8SW set to impress a polarizing voltage $V_{P1}$ through encoder E and switch 7SW positioned so that control C causes E to impress polarizing voltage for one time interval. Once the gate G of $M_n$ is polarized with a threshold voltage $V_{TN}$, 5SW is opened and 6SW closed. Switches 7SW and/or 8SW are then positioned to impress a different polarizing voltage $V_{P2}$ for a different interval through E. A threshold voltage $V_{TP}$ which is different from $V_{TN}$ by the same constant as before ($V_{TN} - V_{TP} = V_A$) is then impressed on the gate of $M_p$. Switch 6SW is then opened and switches 1SW, 2SW, 3SW set in position 3. Switches 5SW and 6SW are closed, a gate voltage $V_G$ measuring the second magnitude is impressed through 3SW and the current measured by meter ME to determine the square of the difference between the magnitudes. A plurality of MINSTOR pairs P controlled as shown in FIG. 19 can be connected in parallel to determine the sum of the squares of the deviations between a plurality of pairs of magnitudes in one operation.

While preferred embodiments of this invention have been disclosed herein, many modifications thereof are feasible. This invention then is not to be restricted except so far as is necessitated by the spirit of the prior art.

I claim:

1. Apparatus for determining the square of difference between a first magnitude and a second magnitude including an n-channel MINSTOR and a p-channel MINSTOR, each MINSTOR having a substrate, a source, a drain and a gate, means connecting in a network the source and drain of one of said MINSTORS in anti-parallel with the source and drain of the other MINSTOR, means, connected to said network, for impressing a voltage between the sources and drains of said MINSTORS, means for connecting one of said gates to the other of said gates, means for applying polarizing voltage between the gates and substrates of said MINSTORS to impress a threshold voltage, which measures said first magnitude, between the gates and the substrates of said MINSTORS, means for impressing a gate voltage which measures said second magnitude between the gate and the source of one of said MINSTORS, and current-measuring means connected to said network to measure the current passed by said sources and drains.

2. The apparatus of claim 1 wherein the MINSTORS are matched so that when polarizing voltage impressed between the gate of one MINSTOR and its substrate is substantially equal to the polarizing voltage impressed between the gate of the other MINSTOR and its substrate and the said voltages are impressed for substantially the same interval of time, the same threshold voltage, measured between each gate and its associated substrate, is impressed on both MINSTORS.

3. The apparatus of claim 1 wherein the connecting means for connecting one of the gates to the other of the gates includes switch means between the gates enabling the impressing of voltages separately between the gate and substrate of one of said MINSTORS and gate and substrate of the other of said MINSTORS.

4. Apparatus for determining the square of the difference between a first magnitude and a second magnitude including an n-channel IGFET and a p-channel IGFET, each IGFET having a source, a drain and a gate, the n-channel IGFET having a threshold voltage $V_{TN}$ with respect to its source and the p-channel IGFET having a threshold voltage $V_{TP}$ with respect to its source, means connecting in a network the source and the drain of the n-channel IGFET in anti-parallel with the source and the drain of the p-channel IGFET, means connecting said gates of said IGFETS to each other, means, connected to said network, for impressing a voltage $V_A$ between said sources and drains, means, connected to said gates, for impressing a voltage $V_{Gg}$ on said gates, and means, connected to said network, for measuring the drain current conducted for said network, $V_{Gg}$, $V_{TP}$, $V_{TN}$ and $V_A$ being related so that the current is a measure of the square of the difference between said first magnitude and said second magnitude.

5. The apparatus of claim 4 wherein the absolute value of $V_A$ is greater than or equal to the absolute value of $V_{TP} - V_{TN}$.

6. The method of determining the square of the difference between a first magnitude, $N_1$, and a second magnitude, $N_2$, with apparatus including a p-channel IGFET and an n-channel IGFET, each said IGFET having a source, a drain and a gate, the said IGFETS having threshold voltages with respect to the respective sources $V_{TP}$ for the p-channel IGFET and $V_{TN}$ for the n-channel IGFET, the said IGFETS being connected to a network in which the sources and the drains of said IGFETS are connected in anti-parallel, one terminal of said network being connected to ground; the said method comprising: impressing a gate voltage of a magnitude, $V_{Gg}$, with reference to ground, on the gates of said IGFETS, impressing a voltage, $V_A$, of a magnitude capable of causing saturation currents to flow through the IGFETS in said network, and measuring the current conducted by said network, the absolute magnitude of $V_A$ being set equal to or greater than the absolute magnitude of $V_{TP} - V_{TN}$ and $V_{Gg}$ being set in the same proportion to $N_1$ as $V_{min}$ is to $N_2$, where $V_{min} = ½(V_A + V_{TS} + V_{TP})$.

7. The method of claim 6 wherein the polarity of the voltage $V_A$ is such that the source of the n-channel IGFET is electrically ground and the drain of the n-channel IGFET is electrically positive relative to ground.

8. The method of claim 6 wherein the polarity of the voltage $V_A$ is such that the source of the p-channel IGFET is electrically ground and the drain of the p-channel IGFET is electrically negative relative to ground.

9. The method of determining the square of the difference between a first magnitude and a second magnitude with a p-channel MINSTOR and an n-channel MINSTOR, each said MINSTOR having a substrate, a source, a drain, and a gate, said MINSTORS being connected in anti-parallel, the said method comprising impressing a drain voltage between the sources and drains of said MINSTORS, impressing a first threshold voltage between the substrate and the gate of one of said MINSTORS and a second threshold voltage between the substrate and the gate of the other of said MINSTORS, at least one of said threshold voltages being set to measure said first magnitude, connecting together the said gates, impressing a gate voltage set to measure said second magnitude on the gates of said MINSTORS, and measuring the current between the sources and drains of said MINSTORS.

10. The method of claim 9 in which the MINSTORS are matched so that substantially equal polarizing voltages impressed respectively between the gate the substrate of each MINSTOR for substantially equal time intervals impresses substantially equal threshold voltages, measured between each gate and the substrate, on the gates of both MINSTORS, the said method being characterized by that said gates are interconnected and thereafter the first and second threshold voltages are impressed simultaneously by impressing substantially equal polarizing voltage for substantially an equal time interval between the respective gates and the respective substrates of said MINSTORS.

11. The method of claim 9 in which the MINSTORS are unmatched so that substantially equal polarizing voltages impressed respectively between the gate the substrate of each MINSTOR for substantially equal time intervals impresses substantially unequal threshold voltages, measured between each gate and the associated substrate, on the gates of both MINSTORS, the said method being characterized by that said gates are interconnected and thereafter the first and second threshold voltages are impressed simultaneously by impressing substantially equal polarizing voltage for substantially an equal time interval between the respective gates and the respective substrates of said MINSTORS, and the drain voltage is set substantially equal to the difference between the first threshold voltage and the second threshold voltage.

12. The method of claim 9 in which the MINSTORS are unmatched so that substantially equal polarizing voltages impressed respectively between the gate and the substrates of each MINSTOR for substantially equal time intervals impresses substantially unequal threshold voltages on the gates of both MINSTORS, the said method being characterized by that while said gates are disconnected a first polarizing voltage is impressed between the gate and the substrate of one MINSTOR for a first predetermined interval of time to impress the first threshold voltage and a second polarizing voltage is impressed between the gate and the substrate of the other MINSTOR for a second predetermined interval of time such that the threshold voltages, measured between each gate and the associated substrates, on the gates of both said MINSTORS are equal, and thereafter the said gates are interconnected.

13. The method of claim 12 wherein the first and second polarizing voltages are substantially equal but the first and second time intervals differ by a magnitude such that the first and second threshold voltages, measured between each gate and its associated substrate, are substantially equal.

14. The method of claim 12 wherein the first and second intervals are equal and the first polarizing voltage differs from the second polarizing voltage by a magnitude such that the first and second threshold voltages, measured between each gate and its associated substrate, are substantially equal.

15. The method of claim 12 wherein the first and second polarizing voltages and the first and second intervals respectively differ by magnitudes such that the first and second threshold voltages, measured between each gate and its associated substrate, are substantially equal.

* * * * *